United States Patent [19]

Perlman et al.

[11] Patent Number: 4,682,230
[45] Date of Patent: Jul. 21, 1987

[54] ADAPTIVE MEDIAN FILTER SYSTEM

[75] Inventors: Stuart S. Perlman, Princeton Township, Mercer County; Sanford Eisenhandler, East Windsor; Paul W. Lyons, Plumstead Township, Ocean County; Michael J. Shumila, Hamilton Township, Mercer County, all of N.J.

[73] Assignee: RCA Corporation, Princeton, N.J.

[21] Appl. No.: 842,644

[22] Filed: Mar. 21, 1986

[51] Int. Cl.⁴ .............................................. H04N 5/21
[52] U.S. Cl. .................................... 358/167; 358/36; 455/307
[58] Field of Search ................... 358/167, 36, 166, 37, 358/905, 222, 168, 169; 455/296, 302, 303, 307

[56] References Cited

U.S. PATENT DOCUMENTS

| | | | |
|---|---|---|---|
| 4,177,430 | 12/1979 | Paul | 455/307 |
| 4,398,296 | 8/1983 | Gott | 375/103 |
| 4,402,013 | 8/1983 | Wargo | 358/160 |
| 4,464,686 | 8/1984 | Reitmeier | 358/36 |
| 4,485,399 | 11/1984 | Schulz | 358/167 |
| 4,517,600 | 5/1985 | Reitmeier | 358/167 |
| 4,562,470 | 12/1985 | Dinh | 358/167 |

OTHER PUBLICATIONS

"Handbook of Tables for Probability and Statistics", edited by W. H. Beyer, 1966, p. 2.

I. Scollar et al.; "Image Enhancement Using the Median and the Interquartile Distance"; Computer Vision, Graphics, and Image Processing; Academic Press, Inc.; 1984; pp. 236-251.

"VLSI Architecture for a One-Chip Video Median Filter"; Demassieux, et al.; Proceedings IEEE International Conference on Acoustics, Speech and Signal Processing, vol. 3, pp. 1001–1004 (1985).

Primary Examiner—Tommy P. Chin
Attorney, Agent, or Firm—Paul J. Rasmussen; Eric P. Herrmann; David N. Caracappa

[57] ABSTRACT

An adaptive median filter system is disclosed. Circuitry is arranged to produce successive sets of samples from an input signal which may possibly include noise. An adaptive median filter filters the samples in response to a control signal. Further circuitry estimates the relative density of the noise in the input signal to generate the control signal supplied to the adaptive median filter.

8 Claims, 4 Drawing Figures

ADAPTIVE MEDIAN FILTER SYSTEM

The present invention relates to adaptive median filter systems.

Developments in image processing have made possible the processing images in a variety of forms. For example, a photograph may be processed as a two-dimensional array of samples. A video signal, as from a television camera, may be processed as a three-dimensional array of samples —the third dimension being the temporal dimension and representing motion in the image. One filtering algorithm which may be applied in the processing of such images is the median filter.

A median filter reduces impulse-type noise in any signal but may be particularly efficacious for reducing such noise in an image such as may be caused by a scratch in a photograph or a dropout in the communications channel over which the video signal is transmitted. A median filter does not adversely affect edges or corners which exist in an image, however. In prior art median filters, the current sample (the sample being filtered) was replaced by a sample having the median value of the values of that sample and a number of samples surrounding that sample.

An enhancement of the median filtering algorithm described above selectively substitutes the sample having the median value for the current sample only if the value of the current sample lies outside of predetermined thresholds. For example, in the paper "Image Enhancement Using the Median and Interquartile Distance" by Scollar et al. in Computervision, Graphics and Image Processing, Vol. 25, pages 236-251 (1984), the difference between the value of the current sample and the median value is compared to a constant times the difference between the upper and lower quartiles (the interquartile distance). If the current sample/median difference is greater than the interquartile distance function, then the sample having the median value is substituted for the current sample. Scollar et al. have found this algorithm advantageous because it "adapts to local contrast in the data, and sharp edges will hardly be blurred at all, . . . ".

In accordance with the principles of the present invention, a further improvement may be achieived if non-image related criteria are used for adapting the median filter algorithm, in addition to the contrast related criteria described in the above Scollar paper. Because one of the primary advantages of a median filter is its ability to attenuate impulse noise, improved operation may be attained if the operation of the adaptive median filter is modified in response to the relative density of impulse noise in the signal being filtered.

Apparatus in accordance with the principles of the present invention comprises a source of an input signal possibly including noise, and a means for producing a plurality of samples representing the signal. An adaptive median filter filters these samples in response to a control signal. A noise estimator estimates the relative density of the noise in the signal being sampled. A control signal generator generates the control signal supplied to the adaptive median filter in response to the estimated noise density.

DETAILED DESCRIPTION

Figure 1:
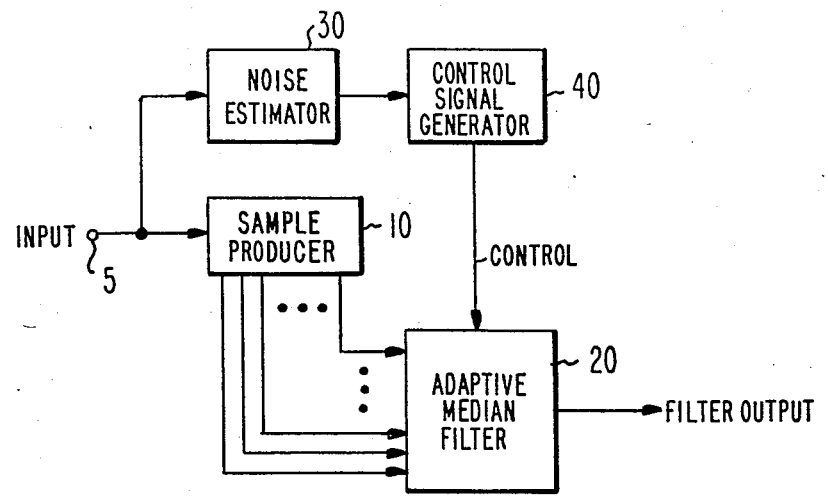
FIG. 1 is a block diagram of an adaptive median filter system in accordance with the principles of the present invention.

In FIG. 1, the input signal being median filtered, for example, a video signal from the front end of a television receiver (not shown) is applied to an input terminal 5. Input terminal 5 is coupled to a sample producer 10 and a noise estimator 30. Sample producer 10 produces a plurality of samples, including a current sample (the sample currently being filtered) representing a given point in the image being processed, and other samples representing points surrounding that point. These samples are coupled to respective data input terminals of an adaptive median filter 20. Adaptive median filter 20 produces at an output terminal a median filtered output signal. An output terminal of noise estimator 30 is coupled to an input terminal of a control signal generator 40 which generates a control signal at an output terminal which is coupled to a control input terminal of the adaptive median filter 20.

In operation, sample producer 10 produces versions of the input signal from terminal 5 which represent the current and surrounding points. In a system in which the input signal is a video signal, sample producer 10 may comprise a tapped delay line which provides a current sample and samples surrounding the current sample either vertically, horizontally, temporally or some combination of these. The adaptive median filter 20 selectively couples either the current sample or a sample having the median value of the current and surrounding samples to the filter output terminal. The decision to substitute a median value sample for the current sample is based upon the values of the input samples and the control signal supplied to the adaptive median filter 20.

Noise estimator 30 evaluates the input signal supplied at input terminal 5 to determine the relative density of the noise in the input signal. Because the adaptive median filter is particularly useful for attenuating impulse noise, noise estimator 30 may, for example, detect the relative density of impulse noise in the input signal. Noise estimator 30 may comprise a threshold detector which produces a pulse whenever the input signal exceeds the thresholds, indicating a noise impulse; and a resettable counter which counts the number of pulses over a predetermined interval of time.

The control signal is generated by control signal generator 40 responsive to the density of impulse noise to more completely attenuate the impulse noise without adversely affecting the intelligence transmitted in the signal. Contol signal generator 40 may, for example, be a decoder for generating control signals having different values which correspond to different ranges of estimated noise density. In a digital implementation, this decoder may e preprogrammed digital memory.

Figure 2:
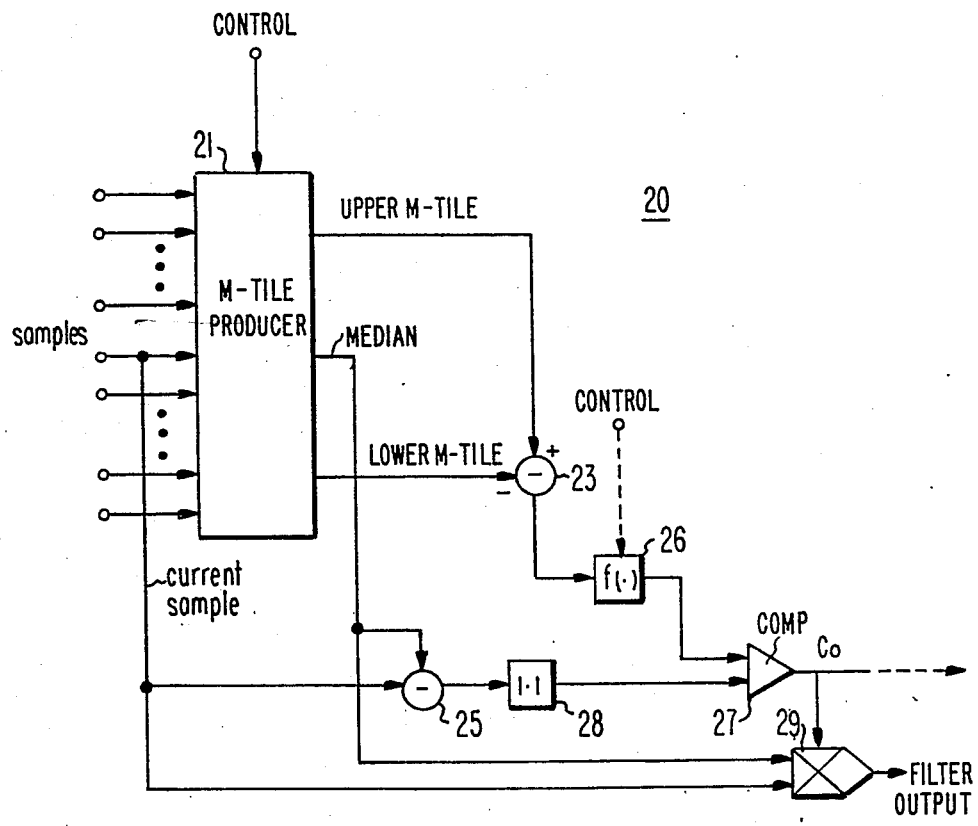
FIG. 2 is a block diagram of an adaptive median filter which may be used in the system illustrated in FIG. 1.

FIG. 2 illustrates an adaptive median filter 20 which may be used in the apparatus illustrated in FIG. 1. In FIG. 2, samples from sample producer 10 of FIG. 1 are coupled to data input terminals of an M-tile producer 21. The control signal from control signal generator 40 is coupled to a control input terminal of M-tile producer 21. M-tile producer 21 produces an upper M-tile sample, a median sample and a lower M-tile sample at three data output terminals. The upper and lower M-tile samples are coupled to respective input terminals of a subtractor 23. The output terminal of subtractor 23 is coupled to a first input terminal of a comparator 27 through a function generator 26. The current sample (at the input of M-tile procducer 21) and the median output sample are coupled to respective input terminals of a subtractor 25. The output terminal of subtractor 25 is coupled to a second input terminal of comparator 27 through an absolute value generator 28. An output terminal of comparator 27 is coupled to a control input terminal of multiplexer 29. A first data input terminal of multiplexer 29 is coupled to receive the median sample from M-tile producer 21. A second data input terminal of multiplexer 29 is coupled to receive the current sample from the input of M-tile producer 21. The data output terminal of multiplexer 29 produces the median filtered output sample.

M-tile is a generic term relating to the relative position of a sample in a list of samples sorted according to their value. The median and upper and lower quartiles are special cases indicating values one-half, three-quaraters and one-quarter of the way through the ordered list respectively.

In operation, M-tile producer 21 sorts the input samples to produce an ordered list of samples. From the ordered list, the middle sample has the median value and is produced at the median output terminal. Samples from two other positions in the ordered list are produced at the upper and lower M-tile output terminals. Which particular positions of the ordered list are selected for the upper and lower M-tiles is controlled by the control signal.

In a paper, "VLSI Achitecture for a One-Chip Video Median Filter" by Demassieux et al. in Proceedings IEEE Internal Conference on Acoustics, Speech and Signal Processing, Vol. 3, pages 1001-1004 (1985), an example of a digital implementation of a median filter is described. This filter includes a sorting element comprising an array of ten 8-bit comparators which sort five 8-bit samples into an order list from which one median value and one upper and lower M-tile value may be taken every clock cycle.

Subtractor 23 subtracts the lower M-tile value from the upper M-tile value. The difference is the inter M-tile distance. A function of the inter M-tile distance is calculated in function generator 26. In the above-mentioned paper by Scollar et al. for example, the interquartile distance is multiplied by a constant.

Other functions of the inter M-tile distance may also be advantageous. For example, a fixed value may be produced, or a linear function of the inter M-tile distance. One such function is one-half times the inter M-tile distance plus a constant. In a digital implementation, the function may be preprogrammed into a programmable read only memory (PROM), having address input terminals coupled to the output of subtractor 23 and data output terminals coupled to comparator 27.

The function of the inter M-tile distance may also be made adaptive in response to the control signal, as illustrated in phantom in FIG. 2. The particular function of the inter M-tile distance selected depends upon the value of the control signal. In a digital implementation including a PROM, the control signal may be supplied to further address input terminals of the PROM into which all possible functions have been programmed.

The output of subtractor 25 is the difference between the median and the current sample. Absolute value generator 28 produces the magnitude of the difference which is called the curent sample/median distance. This distance is compared to the value of the function of the inter M-tile distance by comparator 27. If the current sample/median distance exceeds the processed inter M-tile distance, then comparator 27 generates a signal, Co, having a first state, otherwise signal Co has a second state. If signal Co is in the first state, multiplexer 29 couples the median-valued sample from M-tile producer 21 to the filter output terminal; if signal Co is in the second state, multiplexer 29 couples the current sample to the filter output terminal.

This system may be configured as a standard median filter in which each sample is replaced by a sample having the corresponding median value. If the output of function generator 26 has so small a value that each current sample/median difference always exceeds that value (e.g. 0), then the median-valued sample will always replace the current sample. Conversely, the median filtering may be turned off if the function generator 26 produces so large a value that no current sample/median difference ever exceeds that value. In that case, the current sample will always be passed through mutiplexer 29.

The inter M-tile distance is a measure of the contrast of the image in the locality of the current sample. If the contrast is high, the inter M-tile distance will be large and visa versa. If there is high contrast in the locality of the current sample, then the current sample must deviate relatively greatly from the median value before it will be replaced by the median value. On the other hand, if the contrast is relatively low in the locality of the current sample, then the current sample need vary from the median by only a relatively small amount before it will be replaced by the median value. Such a median filter, therefore, is adaptive and responsive to the local contrast of the image of the area of the current sample.

Figure 3:
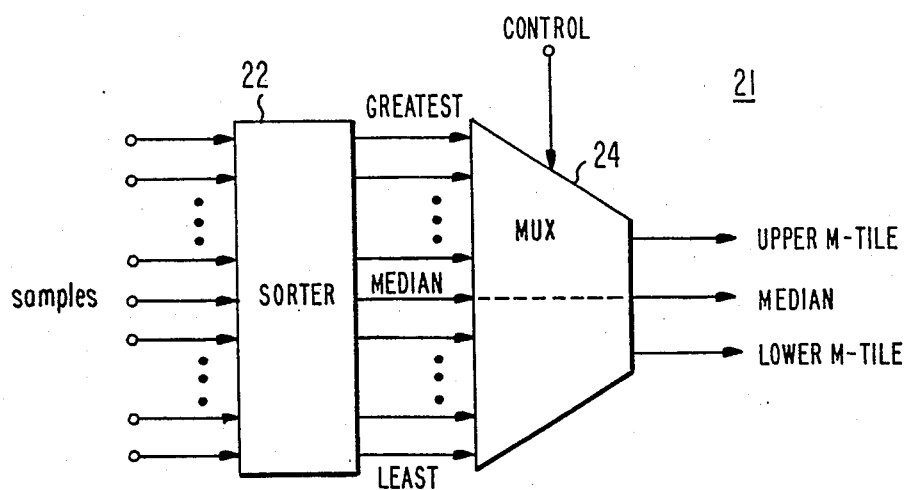
FIG. 3 is a block diagram of an M-tile producer which may be used in the median filter illustrated in FIG. 2.

In the present application, the control signal from control signal generator 40 of FIG. 1 will cause the M-tile producer 21 to produce different upper and lower M-tile values. For example, if the noise density is relatively high, then the upper and lower M-tiles may be selected to be realtively close to the median. The inter M-tile distance is thus smaller, and the current sample need only deviate from the median value by a relatively small amount before it is replaced by the median valued sample. This will tend to replace more samples with the median in response to the higher density of noise. On the other hand, if the noise density is relatively low, then the upper and lower M-tiles may be selected to be relatively farther from the median. In this case, the inter M-tile distance is larger, and the current sample needs to deviate from the median value by a relatively large amount before it is replaced by the median valued sample. This will tend to replace fewer samples with the median in response to the lower density of noise. In addition, if the noise density is very small, it may be advantageous to turn the median filter completely off by proper selection of the function used by function generator 26, as discussed above. FIG. 3 illustrates a possible embodiment of the M-tile producer 21 illustrated in FIG. 2. In FIG. 3. the input samples are coupled to respective input terminals of a sorter element 22. Sorter element 22 may be as described in the above-mentioned Demassieux et al. paper. Sorter element 22 produces at respective output terminals the ordered list of values of the input samples. For example, a sample having the greatest value of the input samples, is produced at the top-most output terminal and a sample having the value of the least value of the input samples is produced at the bottom-most output terminal. Multiplexing circuity (MUX) 24 has respective data input terminals coupled to the output terminals of the sorter element 22. In multiplexing circuit 24, the middle sample output from sorter element 22 is coupled to the median output terminal of multiplexing circuit 24 (as illustrated by the dashed line). The upper M-tile output terminal of multiplexing circuit 24 is coupled to a selected one of the input terminals of multiplexing circuit 24 in response to the control signal. The lower M-tile output terminal of multiplexing circuit 24 is coupled to a different one of the input terminals of multiplexing circuit 24 also dependent upon the control signal.

Multiplexing circuit 24 may, for example, comprise a direct connection from the median input terminal to the median output terminal of multiplexing circuit 24, and two multiplexers one each for coupling the upper M-tile and lower M-tile output terminals respectively to selected input terminals of multiplexing circuit 24, each receiving the control signal from the control input terminal.

Referring again to FIG. 2, comparator 27 produces a logic "1" Co signal whenever the current sample is to be replaced by the median sample. The output Co of comparator 27, thus, is an indication that the current sample may represent a noise impulse which should be replaced. This signal may be used to estimate the relative density of impulse noise in the input signal by ascertaining the number of occurences of impusle noise in an interval of time. The Co signal is shown in phantom coupled to an output terminal in FIG. 2.

Figure 4:
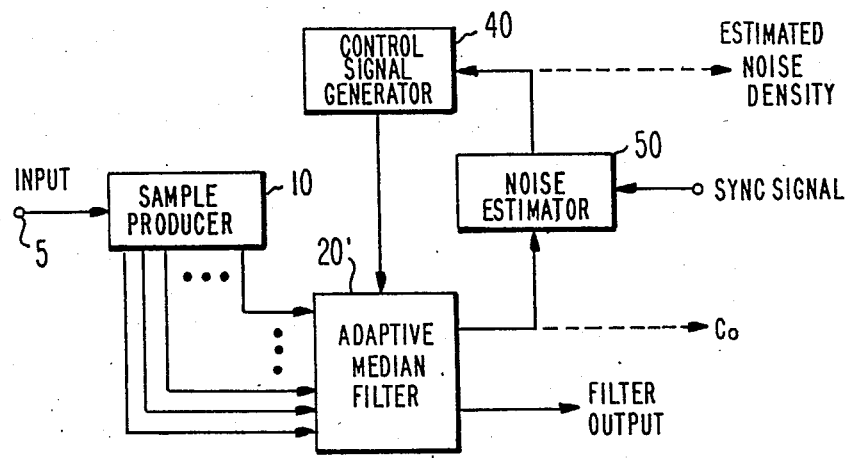
FIG. 4 is a block diagram of an alternative embodiment of an adaptive median filter system in accordance with the principles of the present invention.

FIG. 4 is an alternative embodiment of an adaptive median filter according to the priciples of the present invention. Elements similar to those in FIG. 1 are designated with like numbers and operate in a similar manner. In FIG. 4, an input signal from input terminal 5 is coupled to a sample producer 10. Sample producer 10 supplies a plurality of samples to adaptive median filter block 20'. Adaptive median filter 20' produces at respective output terminals a median filtered output signal and a signal Co which, as described above, indicates that a noise impulse has been detected. The Co signal is coupled to an input terminal of a noise estimator 50. A second input terminal of noise estimator 50 is coupled to a synchronizing signal input terminal. Noise estimator 50 produces at an output terminal an estimate of the relative impulse noise density detected in the input signal. This estimate signal is coupled to the input terminal of control signal generator 40 which produces a control signal coupled to the control input terminal of adaptive median filter 20'.

If the signal at input terminal 5 represents, for example, a composite video signal, then there are time intervals in the video signal during the vertical synchronization interval when the signal is at a predetermined level. The synchronization signal supplied to noise estimator 50 may, for example, be the vertical synchronization component of the composite video signal. During the time interval when the signal is known to be at the predetermined level, any impulses indicated by signal Co are assumed to be caused by noise. The number of impulses indicated by the Co signal from adaptive median filter 20' during the vertical synchronization interval is counted in noise estimator 50. The higher the count, the higher the relative density of the noise. Noise estimator 50 may, for example, comprise a gated digital counter. At the beginning of the vertical synchronization interal, the counter is reset and counting enabled. At the end of the vertical synchronization interval, counting is disabled and the resulting count is latched at the output terminal of noise estimator 50.

The results of impuse counting during the vertical synchronization interval is supplied as the input signal to control signal generator 40 which then generates the control signal to control the upper and lower M-tile values which are used to determine the thresholds used in the adaptive median filter. As described above, for high noise density, the control signal is generated such that the M-tiles are selected relatively close to the median, and for low noise density are selected relatively farther from the median.

It should be noted that the arrangement illustrated in FIG. 4 may be used to estimate the impulse noise density without performing any filtering. Such apparatus would include as an output the estimated impulse noise density from noise estimator 50, as shown in phantom in FIG. 4. It may be desirable to estimate the impulse noise density at all times. In such a case, no synchronization signal input would be required for noise estimator 50. It may be further desirable to produce an indication that an impulse is present. In this case, the Co signal from adaptive median filter 20' is produced at an output terminal, also shown in phantom.

The above embodiments have been described in reference to a composite video signal. It should be noted, however, that any signal which is subject to impulse noise may be advantageously filtered using the adaptive median filter system described above. This invention may also be embodied in a continuous or sampled data system and the sampled data system may be implemented in either analog or digital form.

What is claimed is:

1. An adaptive median filter system, comprising:
   a source of an input signal possibly including noise;
   means responsive to said input signal for producing successive sets of samples representing said input signal;
   means for adaptively median filtering said samples responsive to control signal;
   means responsive to said input signal for estimating the relative density of said noise; and
   means responsive to said estimated noise density for generating said control signal.

2. The system of claim 1, wherein said adaptive median filter means comprises:
   means for determining a median value sample and upper and lower M-tile value samples of said set of samples;
   means responsive to further control signal for selectively substituting said median value sample for a current one of said set of samples being filtered; and
   means responsive to said median valued sampled, said upper and lower M-tile value samples, and said current sample for generating said further control signal.

3. The system of claim 2, wherein said further control signal generator comprises:
   first subtracting means responsive to said upper and lower M-tile value samples for producing the difference therebetween;

second subtacting means responsive to said current sample and said median value sample for producing the difference therebetween; and comparing means coupled to said first and second subtracting means for comparing the differences from said first and second subtracting means and for producing said further control signal if the difference from said second subtracting means exceeds the difference from said first subtracting means.

4. The system of claim 3 wherein said further control signal generator includes:
a function generator coupled between said first subtracting means and said comparing means.

5. The system of claim 4 wherein said function generator includes means for multiplying a signal input to said function generator by a first constant and adding a second non-zero constant.

6. The system of claim 2, wherein said median value and upper and lower M-tile value sample producer comprises:
means having a plurality of input terminals responsive to said set of samples, and a plurality of output terminals for producing said set of samples ordered according to their values; and
multiplexing means having respective data input terminals responsive to said ordered set of samples, data output terminals for producing at least said upper and lower M-tile value samples, and a control input terminal responsive to said control signal, for coupling respective selected ones of said ordered set of samples to said upper and lower M-tile value sample data output terminals in response to the value of said control signal.

7. An adaptive median filter system comprising:
a source of an input signal possibly including noise;
means responsive to said input signal for producing successive sets of samples representing said input signal;
means for adaptively median filtering said samples responsive to a control signal and producing a signal indicating that a current one of said set of samples represents a relatively noisy signal;
means responsive to said indicating signal for estimating the relative density of said noise; and
means responsive to said estimated noise density for generating said control signal.

8. An adaptive median filter system, comprising:
a source of an input signal including alternating synchronization and information time intervals and possibly including noise;
means responsive to said input signal for producing successive sets of samples representing said input signal;
means for adaptively median filtering said samples responsive to a control signal during said information time interval and producing a signal indicating that a current one of said set of samples represents a relatively noisy signal during said synchronization time interval;
means responsive to said indicating signal for estimating the relative density of said noise; and
means responsive to said estimated noise density for generating said control signal.

* * * * *